US010059439B2

(12) United States Patent
Gillett et al.

(10) Patent No.: US 10,059,439 B2
(45) Date of Patent: Aug. 28, 2018

(54) PILOT ASSISTANCE SYSTEM

(71) Applicant: Bell Helicopter Textron Inc., Fort Worth, TX (US)

(72) Inventors: Luke D. Gillett, Grapevine, TX (US); Brandon J. Thomas, Crowley, TX (US); Joseph M. Schaeffer, Cedar Hill, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 292 days.

(21) Appl. No.: 14/800,346

(22) Filed: Jul. 15, 2015

(65) Prior Publication Data

US 2017/0017241 A1   Jan. 19, 2017

(51) Int. Cl.
| | |
|---|---|
| *B64C 27/56* | (2006.01) |
| *B64C 27/57* | (2006.01) |
| *B64C 13/16* | (2006.01) |
| *B64C 13/44* | (2006.01) |
| *B64C 13/46* | (2006.01) |
| *B64D 31/04* | (2006.01) |
| *G05D 1/00* | (2006.01) |
| *G05D 1/08* | (2006.01) |

(52) U.S. Cl.
CPC .............. *B64C 27/56* (2013.01); *B64C 13/16* (2013.01); *B64C 13/44* (2013.01); *B64C 27/57* (2013.01); *B64D 31/04* (2013.01); *G05D 1/0072* (2013.01); *G05D 1/0858* (2013.01); *B64C 13/46* (2013.01)

(58) Field of Classification Search
CPC ......... B64C 27/56; B64C 27/57; B64C 13/46; B64C 13/44; B64C 13/16; B64C 13/08; B64D 31/04; B64D 31/06; B64D 31/10; G05D 1/0072; G05D 1/0858
See application file for complete search history.

(56) References Cited

U.S. PATENT DOCUMENTS

| | | | | |
|---|---|---|---|---|
| 4,648,569 | A * | 3/1987 | Stewart | B64C 13/16 244/76 R |
| 7,984,880 | B2 * | 7/2011 | Gomes | B64C 13/16 244/223 |
| 8,651,425 | B2 * | 2/2014 | Mercer | B64C 27/57 244/17.13 |
| 8,812,177 | B2 * | 8/2014 | Yates | B64C 13/08 701/14 |
| 8,979,036 | B2 * | 3/2015 | Brot | B64C 13/08 244/175 |
| 2016/0304190 | A1 * | 10/2016 | Grohmann | B64C 13/46 |

* cited by examiner

*Primary Examiner* — Richard R Green
(74) *Attorney, Agent, or Firm* — Patent Capital Group

(57) ABSTRACT

According to one embodiment, a pilot assistance system includes a trim assembly and a trim assembly control system. The trim assembly is operable to communicate with a pilot control device and operable to apply a force against the pilot control device in resistance of a command received from a pilot via the pilot control device. The trim assembly control system is in communication with the trim assembly, configured to identify a first pilot control device position relative to a reference pilot control device position, and configured to instruct the trim assembly to apply a cueing force against the pilot control device if the pilot control device is positioned proximate to the first pilot control device position.

20 Claims, 9 Drawing Sheets

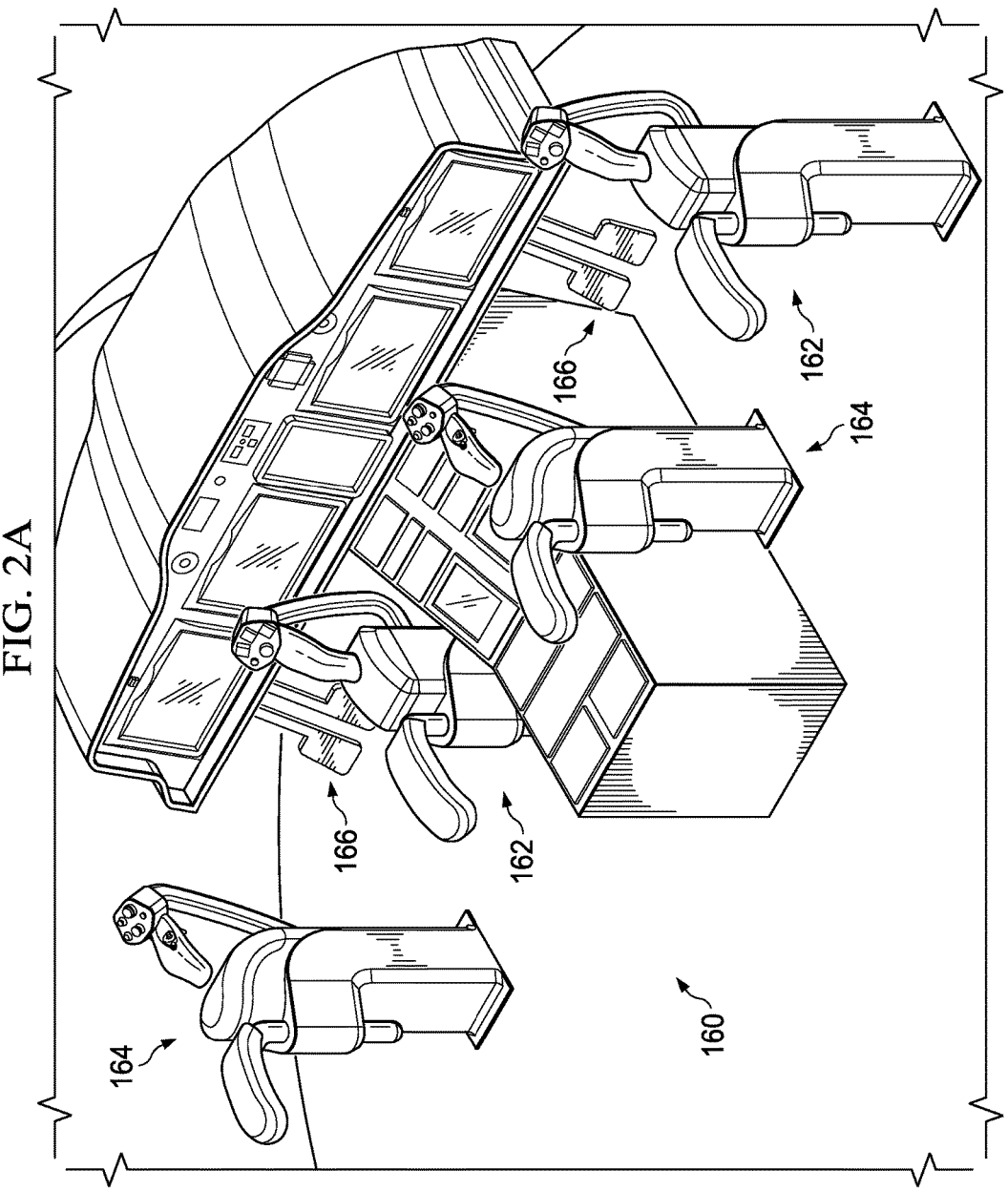

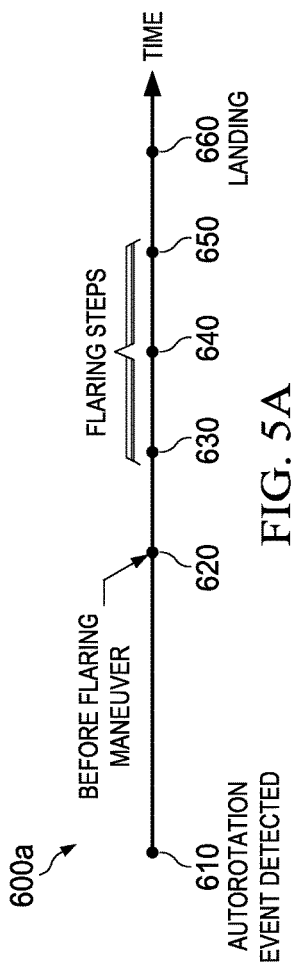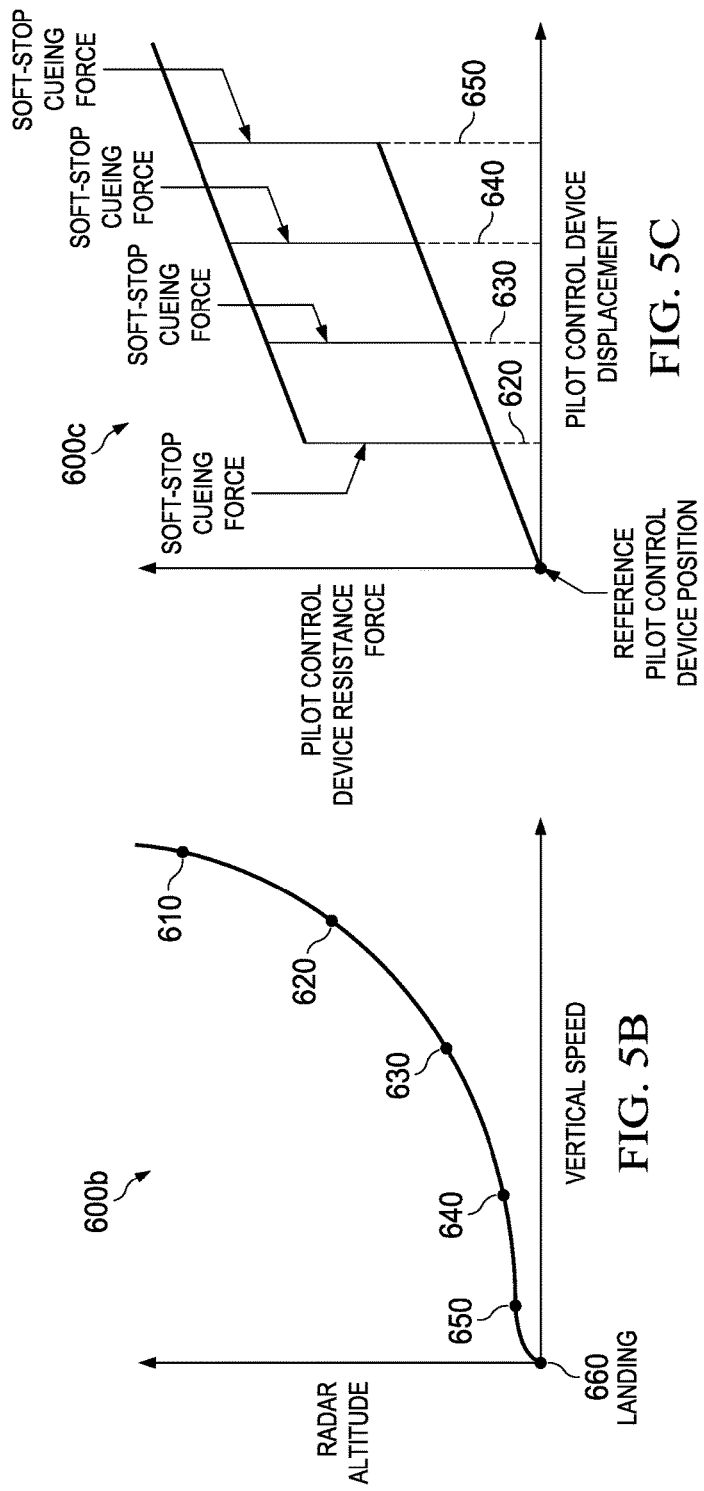
FIG. 5A
FIG. 5B
FIG. 5C

PILOT ASSISTANCE SYSTEM

TECHNICAL FIELD

This invention relates generally to aircraft flight control systems, and more particularly, to a pilot assistance system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide assistance to a pilot performing an autorotation maneuver through the use of physical cueing. A technical advantage of one embodiment may include the capability to use tactile cueing to assist a pilot performing a flaring maneuver to help prevent the pilot from flaring too early or too late. A technical advantage of one embodiment may include the capability to improve safety of a rotorcraft having a low-inertia rotor system.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2A shows a cockpit configuration of the rotorcraft of FIG. 1 according to one example embodiment;

FIG. 3A shows a cyclic trim assembly according to one example embodiment;

FIG. 3B shows a collective trim assembly according to one example embodiment;

FIG. 3C shows an anti-torque trim assembly according to one example embodiment;

FIGS. 5A-5C show application of a soft-stop cueing force during a flaring maneuver according to one example embodiment.

DETAILED DESCRIPTION OF THE DRAWINGS

Figure 1:
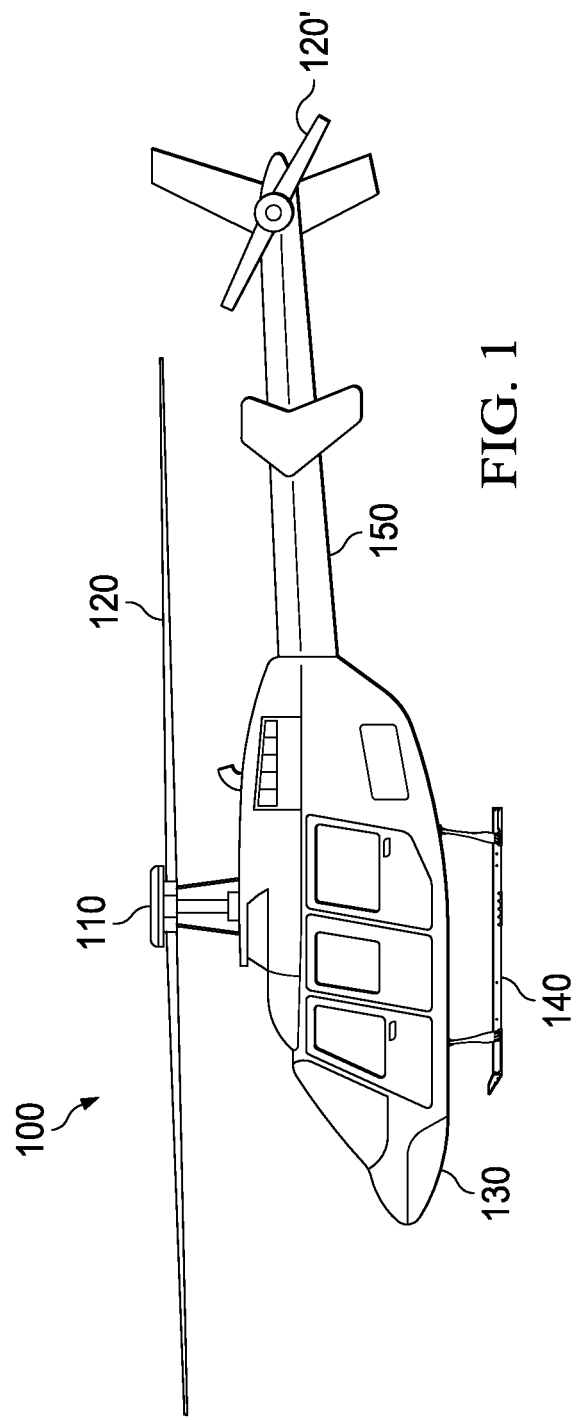
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

A pilot may manipulate one or more pilot flight controls in order to achieve controlled aerodynamic flight. Inputs provided by the pilot to the pilot flight controls may be transmitted mechanically and/or electronically (e.g., via a fly-by-wire flight control system) to flight control devices. Flight control devices may represent devices operable to change the flight characteristics of the aircraft. Examples of flight control devices on rotorcraft 100 may include the control system operable to change the positions of blades 120 and blades 120'.

FIG. 2A shows a cockpit configuration 160 of rotorcraft 100 according to one example embodiment. In the example of FIG. 2A, rotorcraft 100 features at least three sets of pilot flight controls: cyclic control assemblies 162, collective control assemblies 164, and pedal assemblies 166. In the example of FIG. 2A, a set of each pilot flight control is provided for a pilot and a co-pilot (both of which may be referred to as a pilot for the purposes of this discussion).

In general, cyclic pilot flight controls may allow a pilot to impart cyclic motions on blades 120. Cyclic motions in blades 120 may cause rotorcraft 100 to tilt in a direction specified by the pilot. For tilting forward and back (pitch) and/or tilting sideways (roll), the angle of attack of blades 120 may be altered cyclically during rotation, creating different amounts of lift at different points in the cycle.

Collective pilot flight controls may allow a pilot to impart collective motions on blades 120. Collective motions in blades 120 may change the overall lift produced by blades 120. For increasing or decreasing overall lift in blades 120, the angle of attack for all blades 120 may be collectively altered by equal amounts at the same time resulting in ascents, descents, acceleration, and deceleration.

Anti-torque pilot flight controls may allow a pilot to change the amount of anti-torque force applied to rotorcraft 100. As explained above, blades 120' may counter the torque effect created by rotor system 110 and blades 120. Anti-torque pilot flight controls may change the amount of anti-torque force applied so as to change the heading of rotorcraft 100. For example, providing anti-torque force greater than the torque effect created by rotor system 110 and blades 120 may cause rotorcraft 100 to rotate in a first direction, whereas providing anti-torque force less than the torque effect created by rotor system 110 and blades 120 may cause rotorcraft 100 to rotate in an opposite direction. In some embodiments, anti-torque pilot flight controls may change the amount of anti-torque force applied by changing the pitch of blades 120', increasing or reducing the thrust produced by blades 120' and causing the nose of rotorcraft 100 to yaw in the direction of the applied pedal. In some embodiments, rotorcraft 100 may include additional or different anti-torque devices (such as a rudder or a NOTAR anti-torque device), and the anti-torque pilot flight controls may change the amount of force provided by these additional or different anti-torque devices.

In some embodiments, cyclic control assembly 162, collective control assembly 164, and pedal assemblies 166 may be used in a fly-by-wire flight control system. In the example of FIG. 2A, each cyclic control assembly 162 is located to the right of a pilot seat, each collective control assembly 164 is located to the left of a pilot seat, and pedal assembly 166 is located in front of a pilot seat. Teachings of certain embodiments recognize that cyclic control assemblies 162, collective control assemblies 164, and pedal assemblies 166 may be located in any suitable position.

In some embodiments, cyclic control assembly 162, collective control assembly 164, and pedal assemblies 166 may be in mechanical communication with trim assembly boxes that convert mechanical inputs into fly-by-wire flight control commands. These trim assembly boxes may include, among other items, measurement devices for measuring mechanical inputs (e.g., measuring input position) and trim motors for back-driving the center positions of the cyclic control assembly 162, collective control assembly 164, and/or pedal assemblies 166.

Figure 2B:
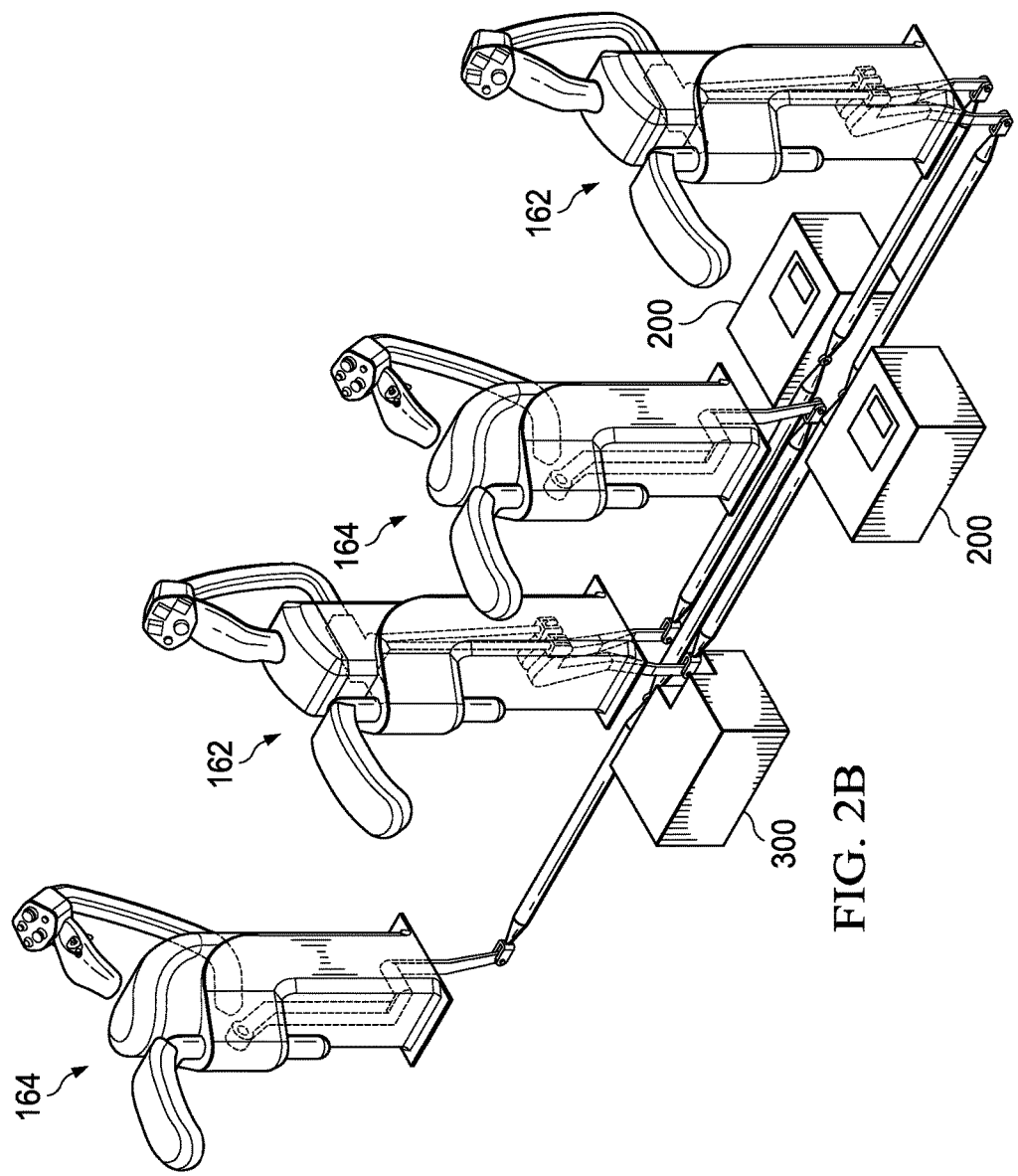
FIG. 2B shows an installation of two cyclic control assemblies and two collective control assemblies of FIG. 2A according to one example embodiment.

For example, FIG. 2B shows an installation of two cyclic control assemblies 162 and two collective control assemblies 164 according to one example embodiment. In this example, the two cyclic control assemblies 162 and two collective control assemblies 164 are coupled to three integrated trim assemblies: two cyclic trim assemblies 200 and a collective trim assembly 300. One of the cyclic trim assemblies 200 manages left/right cyclic tilting movements, and the other cyclic trim assembly 200 manages front/back tilting movements.

In the example of FIG. 2B, cyclic trim assemblies 200 and collective trim assembly 300 are operable to receive and measure mechanical communications of cyclic and collective motions from the pilot. In this example, cyclic trim assemblies 200 and collective trim assemblies 300 may represent components in a fly-by-wire flight control system, and the measurements from cyclic trim assemblies 200 and collective trim assemblies 300 may be sent to a flight control computer operable to instruct rotor system 110 to change a position of blades 120 based on the received measurements. For example, the flight control computer may be in communication with actuators or other devices operable to change the position of blades 120.

Figure 2C:
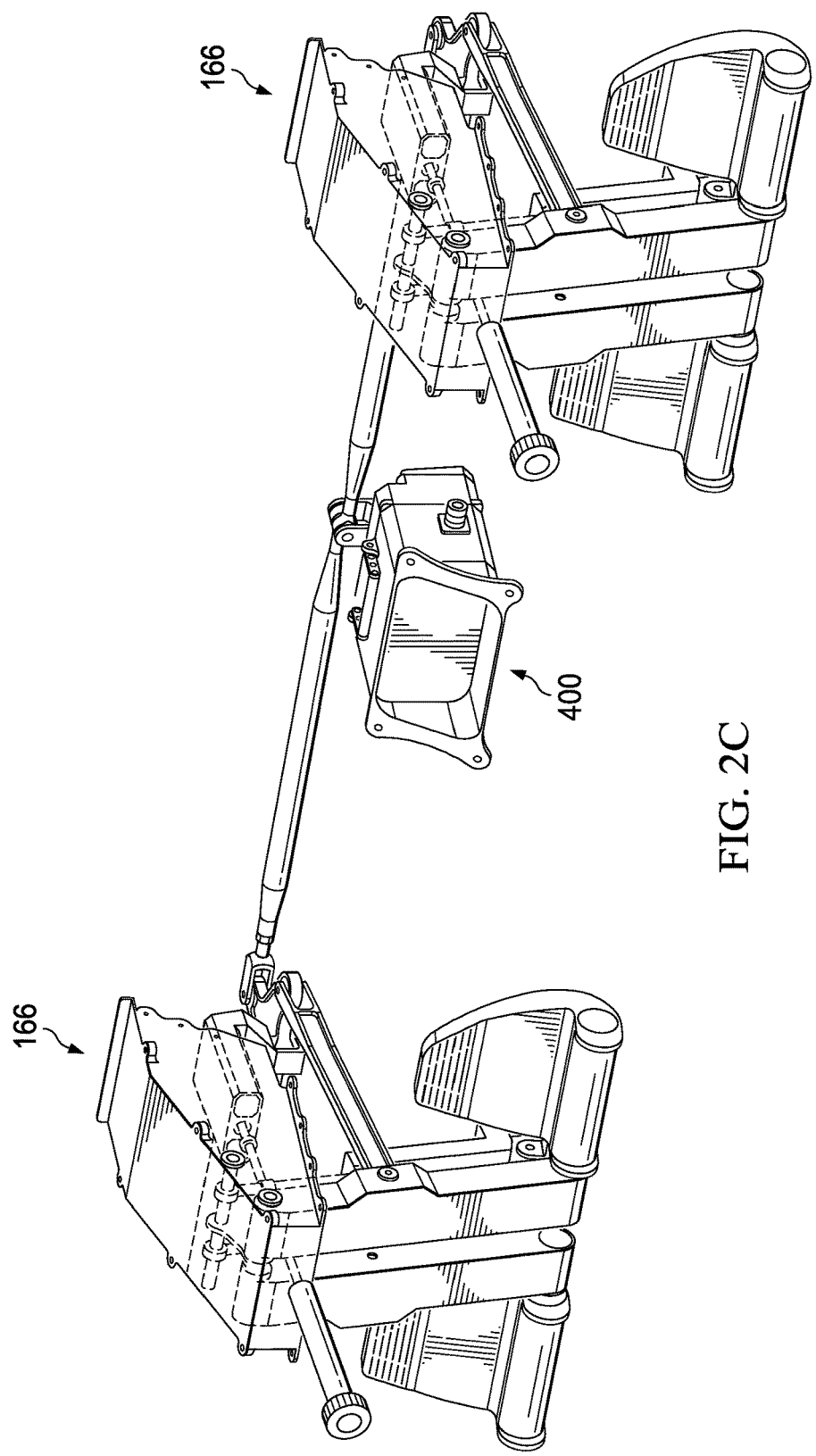
FIG. 2C shows an installation of two pedal assemblies of FIG. 2A according to one example embodiment.

As another example, FIG. 2C shows an installation of pedal assemblies 166 according to one example embodiment. In this example, the two pedal assemblies 166 are coupled to an anti-torque trim assembly 400. In the example of FIG. 2C, pedal linkages are in mechanical communication via a rocker arm and pedal adjustment linkages. The rocker arm is operable to rotate about a point of rotation. In this example, pushing in one pedal causes the pedal adjustment linkage to rotate the rocker arm, which in turn causes the pedal adjustment linkage to push out the other pedal in an opposite direction.

In addition, rotating the rocker arm also causes a trim linkage to reposition a mechanical input associated with anti-torque assembly 400. In this manner, the pilot may mechanically communicate anti-torque commands to anti-torque assembly 400 by moving the pedals. Furthermore, trim linkages couple adjacent pedal assemblies 166 together such that pilot pedals and co-pilot pedals are in mechanical communication.

Figure 3A:
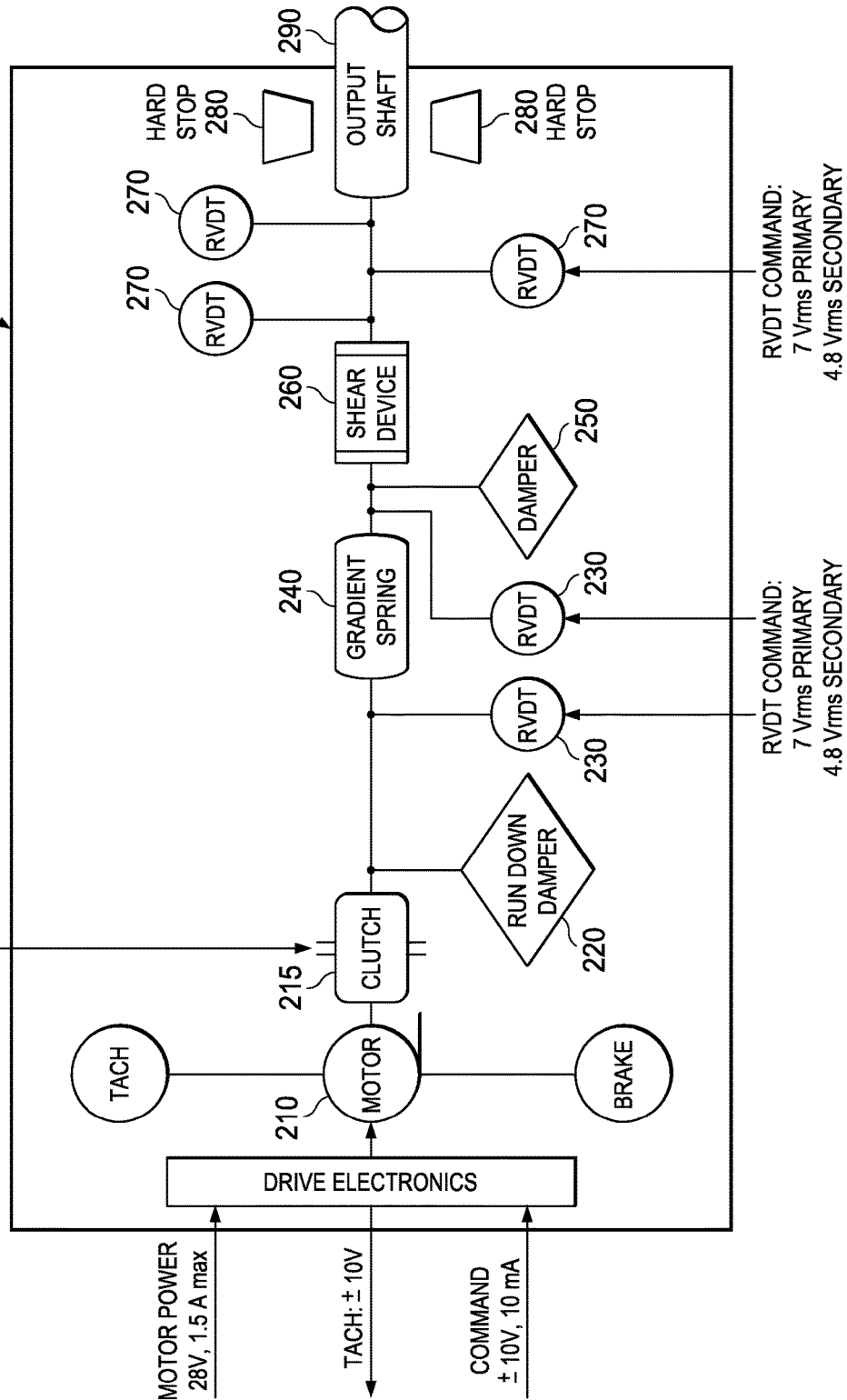
FIGS. 3A, 3B, and 3C show the trim assemblies of FIGS. 2B and 2C according to one example embodiment.
Figure 3B:
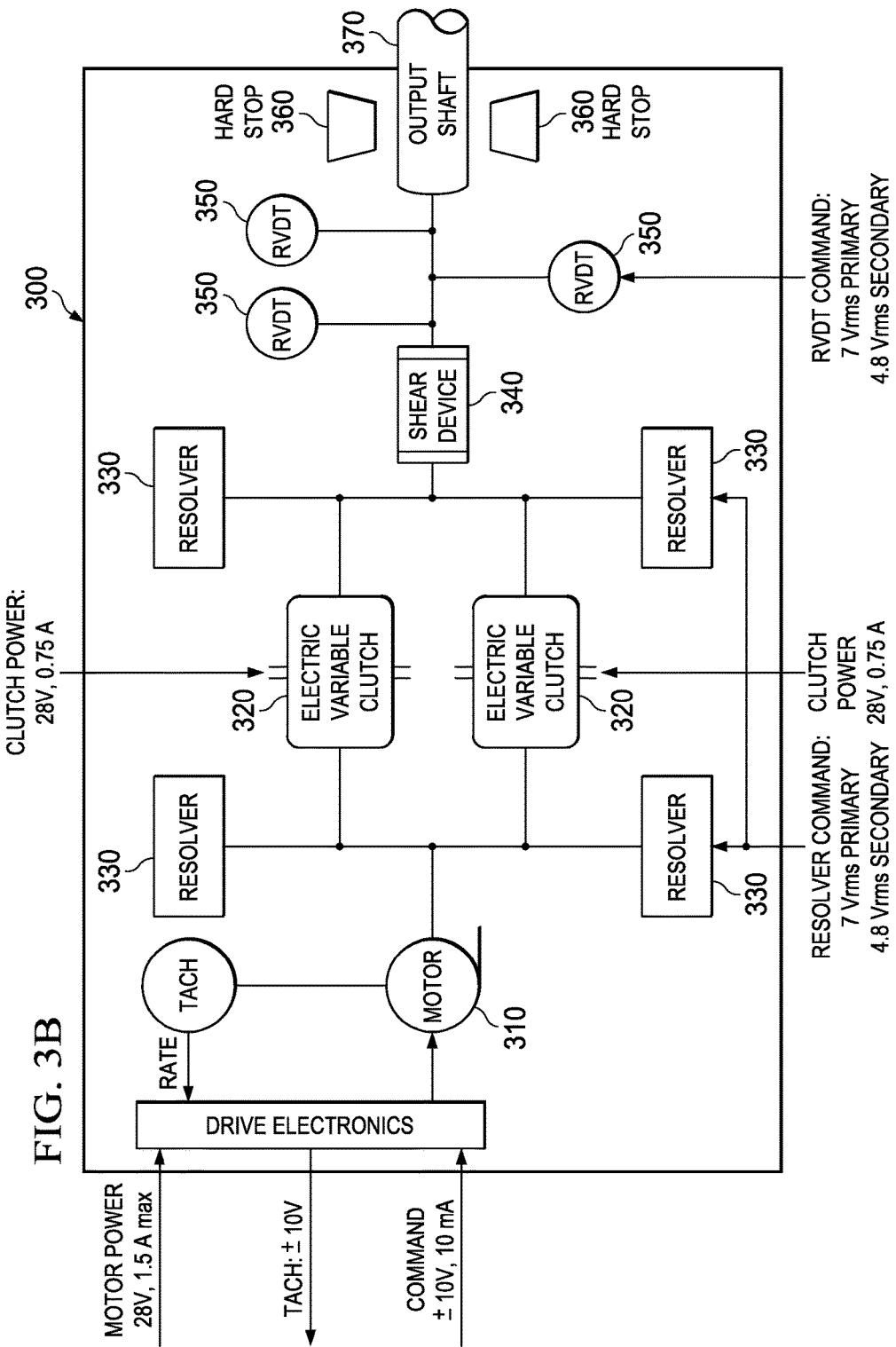
Figure 3C:
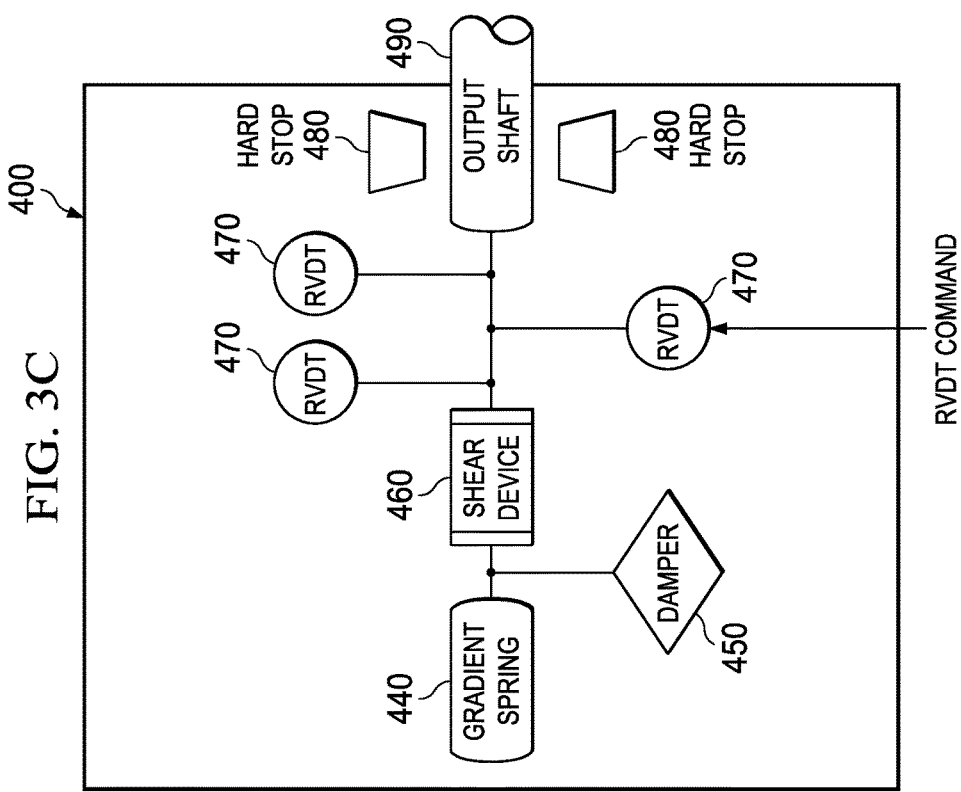

FIGS. 3A, 3B, and 3C show the trim assemblies of FIGS. 2B and 2C according to one example embodiment. FIG. 3A shows cyclic trim assembly 200 according to one example embodiment, FIG. 3B shows collective trim assembly 300 according to one example embodiment, and FIG. 3C shows anti-torque trim assembly 400 according to one example embodiment.

FIG. 3A shows an example embodiment of cyclic trim assembly 200 featuring a trim motor 210, a clutch 215, a run-down damper 220, position measurement devices 230, a gradient spring 240, a damper 250, a shear device 260, position measurement devices 270, mechanical stop devices 280, and an output shaft 290. Although shaft 290 may be described as a single shaft, teachings of certain embodiments recognize that shaft 290 may represent multiple pieces. As one example, shaft 290 may include two shafts separated by gradient spring 240. In another example, shaft 290 may represent a single shaft with a torsion spring attached.

In operation, according to one example embodiment, output shaft 290 and cyclic control assemblies 162 are in mechanical communication such that movement of the grip results in movement of output shaft 290 and movement of output shaft 290 likewise results in movement of the grip. Movement of output shaft 290 may be measured by position measurement devices 230 and 270. The measurements from measurement devices 230 and 270 may be used to instruct rotor system 110 as to how to change the position of blades 120.

In the example of FIG. 3A, cyclic trim assembly 200 may operate in three modes of operation. In the first mode of operation, clutch 215 is engaged, and trim motor 210 drives output shaft 290. This first mode of operation may represent, for example, operation of cyclic trim assembly 200 during auto-pilot operations. In this example, trim motor 210 may drive movement of output shaft 290 so as to drive movement of the grip of cyclic control assembly 162. Position measurement devices 230 and 270 may also measure how trim motor 210 drives output shaft 290 and communicate these measurements to rotor system 110.

In the second mode of operation, clutch 215 is disengaged, and the pilot drives output shaft 290 by way of cyclic control assembly 162. In this example, the pilot changes the position of output shaft 290, which may be measured by position measurement devices 230 and 270. Position measurement devices 230 and 270 may measure how the pilot drives output shaft 290 and communicate these measurements to rotor system 110.

In the third mode of operation, clutch 215 is engaged, and trim motor 210 holds its output arm at a trim position so as to provide a ground point for output shaft 290. In this example, the pilot may change the position of output shaft 290 about the trim position set by trim motor 210. When the pilot releases the grip, the grip may move to the trim position corresponding to the position established by trim motor 210. In some embodiments, the first and third modes of operations may be combined such that trim motor 210 moves the trim position during operation.

Thus, trim motor 210 may provide cyclic force and/or trim to cyclic control assembly 162 through output shaft 290. In one example embodiment, trim motor 210 is a 28 volt DC permanent magnet motor. In operation, trim motor 210 may provide an artificial force feel for a flight control system about an anchor point. Clutch 215 provides a mechanism for engaging and disengaging trim motor 210.

FIG. 3B shows an example embodiment of collective trim assembly 300 featuring a trim motor 310, clutches 320, resolvers 330, a shear device 340, position measurement devices 350, mechanical stop devices 360, and an output shaft 370. Although shaft 370 may be described as a single shaft, teachings of certain embodiments recognize that shaft 370 may represent multiple pieces.

In operation, according to one example embodiment, output shaft 370 and collective control assemblies 164 are in mechanical communication such that movement of the grip results in movement of output shaft 370 and movement of output shaft 370 likewise results in movement of the grip. Movement of output shaft 370 may be measured by position measurement devices 350. The measurements from measurement devices 350 may be used to instruct rotor system 110 as to how to change the position of blades 120.

In the example of FIG. 3B, collective trim assembly 300 may operate in three modes of operation. In the first mode of operation, clutches 320 are engaged, and trim motor 310 drives output shaft 370. This first mode of operation may represent, for example, operation of collective trim assembly 300 during auto-pilot operations. In this example, trim motor 310 may drive movement of output shaft 370 so as to drive movement of the grip of collective control assembly 164. Position measurement devices 350 may also measure how trim motor 310 drives output shaft 370 and communicate these measurements to rotor system 110.

In the second mode of operation, clutches 320 are disengaged, and the pilot drives output shaft 370 by way of collective control assembly 164. In this example, the pilot changes the position of output shaft 370, which may be measured by position measurement devices 350. Position measurement devices 350 may measure how the pilot drives output shaft 370 and communicate these measurements to rotor system 110.

In the third mode of operation, clutches 320 are engaged, and trim motor 310 holds its output arm at a trim position so as to provide a ground point for output shaft 370. In this example, the pilot may change the position of output shaft 370 about the trim position set by trim motor 310. When the pilot releases the grip, the grip may move to the trim position corresponding to the position established by trim motor 310. In some embodiments, the first and third modes of operations may be combined such that trim motor 310 moves the trim position during operation.

Thus, trim motor 310 may provide collective force and/or trim to collective control assembly 164 through output shaft 370. In one example embodiment, trim motor 310 is a 28 volt DC permanent magnet motor. In operation, trim motor 310 may provide an artificial force feel for a flight control system about an anchor point. Clutches 320 provide a mechanism for engaging and disengaging trim motor 310.

FIG. 3C shows an example embodiment of anti-torque trim assembly 400 featuring a gradient spring 440, a damper 450, a shear device 460, position measurement devices 470, mechanical stop devices 480, and an output shaft 490. Although shaft 490 may be described as a single shaft, teachings of certain embodiments recognize that shaft 490 may represent multiple pieces.

In operation, according to one example embodiment, output shaft 490 and pedal assemblies 166 are in mechanical communication such that movement of the pedals results in movement of output shaft 490 and movement of output shaft 490 likewise results in movement of the pedals. Movement of output shaft 490 may be measured by position measurement devices 470. The measurements from measurement devices 470 may be used to instruct rotor system 110 as to how to change the position of blades 120' (or to change operation of an alternative anti-torque system).

During operation of a vehicle such as rotorcraft 100, a pilot may direct the vehicle to perform one or more maneuvers using pilot control devices such as cyclic control assembly 162, collective control assembly 164, and pedal assemblies 166. At the same time, however, the pilot may receive information from other sources that may distract the pilot from directing the vehicle using the pilot control devices. For example, in some scenarios, the pilot may not be able to monitor information displayed on the cockpit dashboard at the same time as monitoring activity taking place outside the vehicle. It would be easier for the pilot to monitor activity taking place outside the vehicle, however, if the pilot could receive the information from the cockpit display in another format. Accordingly, teachings of certain embodiments recognize the capability to provide information to the pilot via physical cueing instead of providing the same information via visual cockpit displays.

Teachings of certain embodiments recognize that a pilot may have an increased need for non-visual information during high-workload operations such as autorotation. Autorotation is a state of flight where the main rotor system of a rotorcraft or similar aircraft turns by the action of air moving up through the rotor, as with an autogyro, rather than engine power driving the rotor. Autorotation flight may occur during an emergency flight condition, such as when one or more engines are not operating. It is the means by which a helicopter may land safely in the event of engine failure. Consequently, all single-engine helicopters must demonstrate this capability to obtain a type certificate.

During autorotation conditions, a pilot may perform a number of maneuvers to preserve rotational energy and glide the aircraft safely to the ground. One example of such a maneuver is a flaring maneuver. In a flaring maneuver, the pilot may change the rotor-blade pitch from negative to positive at just the right time to land the aircraft on the ground. Since the flaring maneuver may use the last of the remaining kinetic energy in the rotors, the pilot should time the maneuver as perfectly as possible. If the pilot flares too late, the aircraft will hit the ground hard; if the pilot flares too early, the aircraft will run out of kinetic energy and plunge the rest of the way to the ground (and therefore also hit the ground hard).

In any autorotation maneuver, the key is ensuring that the rotors keep rotating even after the rotor system stops receiving power from the engines. If a rotor system loses its rotational energy and the blades stop spinning before the rotorcraft lands, the rotorcraft would soon plummet to the earth in freefall.

Accordingly, flaring execution is particularly important if flying a rotorcraft with a low-inertia rotor system. In typical high-inertia rotor systems, a pilot may manually manage flaring maneuvers without requiring assistance because a high-inertia rotor system has the ability to maintain rotor speed during autorotation even if the pilot flares too early or too late. Performing such a maneuver with a low-inertia rotor system, however, requires a greater level of precision and makes flaring timing more critical because a mistake could result in a loss of rotor speed that the aircraft cannot recover from.

Teachings of certain embodiments recognize the capability to provide assistance to a pilot performing an autorotation maneuver through the use of physical cueing. For example, teachings of certain embodiments recognize the capability to use tactile cueing to assist a pilot performing a flaring maneuver to help prevent the pilot from flaring too early or too late.

Figure 4:
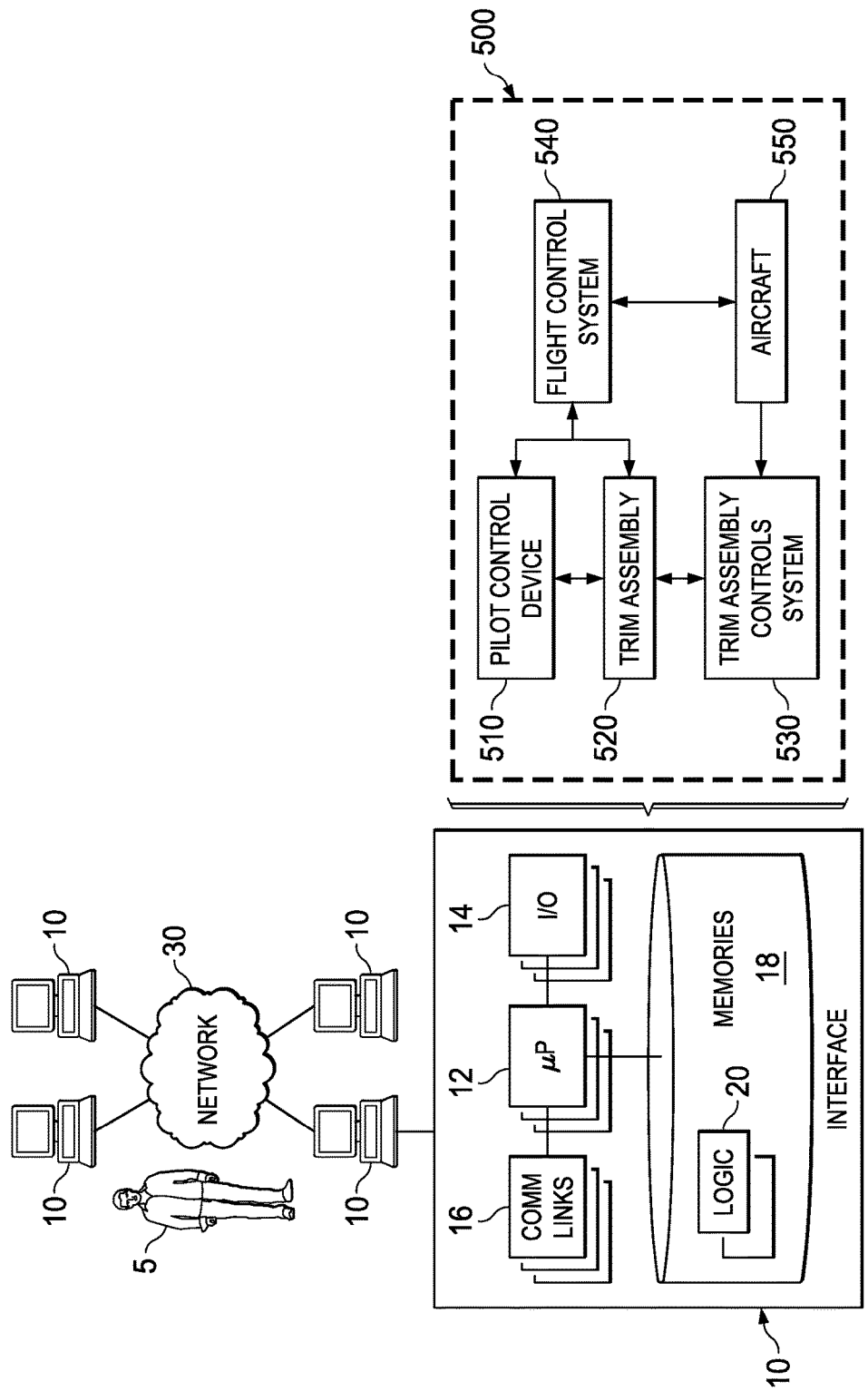
FIG. 4 shows a pilot assistance system according to one example embodiment.

FIG. 4 shows a pilot assistance system 500 according to one example embodiment. In the example embodiment of FIG. 4, pilot assistance system 500 features a pilot control device 510, a trim assembly 520, a trim assembly control system 530, a flight control system 540, and an aircraft 550.

Elements of pilot assistance system 500 may be implemented at least partially by one or more computer systems 10. All, some, or none of the components of pilot assistance system 500 may be located on or near aircraft 550.

Users 5 may access pilot assistance system 500 through computer systems 10. For example, in some embodiments, users 5 may provide flight control inputs that may be processed using a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In the example embodiment of FIG. 4, pilot assistance system 500 features a pilot control device 510, a trim assembly 520, a trim assembly control system 530, a flight control system 540, and an aircraft 550. Pilot control device 510 may represent any device that receives inputs from a pilot, including but not limited to cyclic control assembly 162, collective control assembly 164, and pedal assemblies 166. Trim assembly 520 may include any device in mechanical communication with pilot control device 510 that may provide tactile cueing to a pilot via pilot control device 510.

Examples of trim assembly 520 may include, but are not limited to, cyclic trim assembly 200, collective trim assembly 300, and anti-torque trim assembly 400. Trim assembly control system 530 may include any system configured to control operation of trim assembly 520. Flight control system 540 may include any system configured to control operation of aircraft 550, such as a rotor system associated with aircraft 550. Aircraft 550 may represent any vehicle, including but not limited to rotorcraft 100.

In operation, according to one example embodiment, trim assembly control system 530 determines whether aircraft 550 is operating in a situation that could be improved by providing pilot assistance. One example of such a situation is if aircraft 550 is operating in an emergency flight condition, such as a failure of one or more engines.

If the vehicle is operating in such a situation, trim assembly control system 530 may identify a first pilot control device position relative to a reference position. Examples of a reference position may include, but are not limited to, a detent position or a center position. The first pilot control device position may represent, for example, a preferred position of pilot control device 510 during operation of aircraft 550. In one example scenario, the first pilot control device position may represent a preferred position for where the pilot should hold pilot control device 510 during performance of a flaring maneuver. During such a flaring maneuver, the preferred position may move over time (e.g., may move away from the reference position during performance of a flaring maneuver); accordingly, teachings of certain embodiments recognize the ability to move the preferred position relative to the reference position during performance of the flaring maneuver. Thus, in this example, trim assembly control system 530 may identify and update the preferred position based on the operation of aircraft 550, such as the status of aircraft 550 during performance of an autorotation maneuver.

Trim assembly control system 530 may determine whether aircraft 550 is operating in a situation that could be improved by providing pilot assistance (e.g., autorotation flight) and identify a first pilot control device position relative to a reference position based on a variety of inputs. Examples of such inputs may include, but are not limited to, vertical speed, vertical acceleration, altitude (e.g., radar altitude), rotor speed, rate of decay of rotor speed, engine speed, and autorotation flags (e.g., OEI/AEO flags). Trim assembly control system 530 may use this information to, for example, detect whether aircraft 550 is in autorotation conditions and determine the preferred position for pilot control device 510 in such conditions.

After identifying the first pilot control device position, trim assembly control system 530 may instruct trim assembly 520 to apply a cueing force against pilot control device 510 if pilot control device 510 is positioned proximate to the first pilot control device position. This cueing force might signal to the pilot, for example, that pilot control device 510 should not be moved past the first pilot control device position. Such might be the case, for example, in a flaring maneuver during autorotation flight, when moving the pilot control device 510 (e.g., collective control assembly 164) past the first pilot control device position may result in over-flaring. In this example, failing to move the pilot control device 510 to the first pilot control device position may result in the opposite problem: under-flaring. Accordingly, teachings of certain embodiments recognize the capability to provide a cueing force that the pilot can pull pilot control device 510 against but not exceed without an excessive amount of force.

One example of such a cueing force might include a soft-stop force. In this example, trim assembly control system 530 could instruct trim assembly 520 to apply a first force against pilot control device 510 in resistance of the command from the pilot if the pilot control device is positioned between the first pilot control device position and the reference pilot control device position and instruct trim assembly 520 to apply a second force, greater than the first force, against pilot control device 510 in resistance of the command from the pilot if the pilot control device is positioned beyond the first pilot control device position. In this example, the gradient force exerted against pilot control device 510 steps up from the first force to the second force when pilot control device 510 is brought proximate to the first pilot control device position.

FIGS. 5A-5C show application of a soft-stop cueing force during a flaring maneuver according to one example embodiment. FIG. 5A shows a timeline 600a of events during an example autorotation scenario, and FIG. 5B shows a graph 600b of the various aircraft stages as a function of radar altitude (i.e., height above terrain) versus vertical speed.

At stage 610, trim assembly control system 530 receives information indicating that aircraft 550 is operating in autorotation conditions. At stage 620, trim assembly control system 530 implements a pre-flaring cueing force. At stages 630-650, trim assembly control system 530 implements cueing forces during rotor blade flaring. At stage 660, aircraft 550 lands. Teachings of certain embodiments recognize that these six stages are describe for illustration purposes only, and that trim assembly control system 530 may implement operations during more, fewer, and/or different stages that those mentioned herein.

FIG. 5C shows a graph 600c of the soft-stop cueing forces applied at stages 620 through 650. In this example embodiment, trim assembly 520 applies a resistive force against pilot control device 510. This resistive force opposes the force applied by the pilot when the pilot moves pilot control device 510 away from the reference position (in this example, the reference position corresponds to a detent position corresponding to a selected rotor speed of 103% rotor speed). In the example of FIG. 5B, the amount of resistive force increases as pilot control device 510 moves further away from the reference position.

At stage 620, trim assembly control system 530 instructs trim assembly 520 to apply a soft-step force against pilot control device 510 proximate to the first pilot control device location. The first pilot control device location in this example is indicated by the location of the soft-stop force relative to the x-axis. In this example, the soft-stop cueing force is represented by an increase in resistive force of about three pounds. Thus, in this example soft-stop cueing force, the second force (applied against pilot control device 510 in resistance of the command from the pilot if the pilot control device is positioned beyond the first pilot control device position) is at least three pounds larger than the first force (applied against pilot control device 510 in resistance of the command from the pilot if the pilot control device is positioned between the first pilot control device position and the reference pilot control device position). Because this example shows a constant force gradient on both sides of the soft-stop, the first force may be expressed by the equation $y=mx$ (where y is the resistive force, x is the displacement distance from the reference position, and m is the force gradient), and the second force may be expressed by the equation $y=mx+c$ (where c is the value of the soft-stop cueing force, e.g., three pounds).

In this example embodiment, the soft-stop cueing force may be applied at a preferred position of pilot control device 510 during operation of aircraft 550. If, for example, the pilot pulls pilot control device 510 (e.g., collective control assembly 164) against the soft-stop cueing force—but not so hard as to overcome the cueing force—then pilot control device 510 would be located proximate to the preferred position. Teachings of certain embodiments recognize that this scenario would allow a flight control computer to instruct a pilot on how to operate aircraft 550 during a maneuver (e.g., an autorotation maneuver) using tactile cueing rather than by providing visual or audible information.

Returning to the example of FIG. 5A, aircraft 550 progresses past stage 620 through stages 630, 640 and 650 on the way to landing at stage 660. As aircraft 550 progresses past these stages, the preferred position of pilot control device 510 would change. Accordingly, teachings of certain embodiments recognize the capability to move the location at which the soft-stop cueing force is applied such that it continues to correspond with the preferred position of pilot control device 510 throughout the autorotation maneuvers.

Accordingly, in the example of FIG. 5B, the location at which trim assembly 520 applies the soft-stop cueing force changes as aircraft 550 progresses past stage 620 through stages 630, 640 and 650 on the way to landing at stage 660. As seen in the example of FIG. 5C, the location of the soft-stop cueing force moves away from the reference position as aircraft 550 progresses through the flaring steps 630-650.

Although examples discussed herein describe moving the location of a first pilot control device position, teachings of certain embodiments recognize that any such movement may be made relative to the reference position, and therefore it may be possible to move a first pilot control device position by moving the first pilot control device position, the reference pilot control device position, or a combination of the two. For example, if trim assembly 520 features a gradient spring that provides a resistive force, moving the reference position from which that spring is fixed can change the resistive force.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 3 of 35 U.S.C. § 112 as it exists on the date of filing hereof unless the words "means for" or "step for" are explicitly used in the particular claim.

What is claimed is:

1. A rotorcraft, comprising:
    a body;
    a power train coupled to the body and comprising one or more power sources and a drive shaft coupled to the one or more power sources;
    a rotor system coupled to the power train and comprising a plurality of rotor blades;
    a flight control system operable to change at least one operating condition of the rotor system;
    a pilot control device in communication with the flight control system and operable to receive a command from a pilot;
    a trim assembly in mechanical communication with the pilot control device and operable to apply a force against the pilot control device in resistance of the command from the pilot; and
    a trim assembly control system in communication with the trim assembly and configured to:
        determine that the rotorcraft is operating in an emergency flight condition;
        identify a first pilot control device position relative to a reference pilot control device position, wherein the first pilot control device position is identified based on a correspondence between a value of one or more variable and one of a plurality of stages of a maneuver during the emergency flight condition; and
        instruct the trim assembly to apply a cueing force against the pilot control device if the pilot control device is positioned proximate to the first pilot control device position.

2. The rotorcraft of claim 1, wherein the emergency flight condition comprises a failure of at least one of the one or more power sources.

3. The rotorcraft of claim 1, wherein:
    the trim assembly control system is configured to apply the cueing force against the pilot control device in response to a failure of at least one of the one or more power sources; and
    the first pilot control device position identified by the trim assembly control system represents a preferred position of the pilot control device during performance of a flaring maneuver.

4. The rotorcraft of claim 3, the trim assembly control system configured to move the first pilot control device position relative to the reference position during the performance of the flaring maneuver.

5. The rotorcraft of claim 4, wherein the first pilot control device position moves away from the reference pilot control device position during the performance of the flaring maneuver.

6. The rotorcraft of claim 1, wherein the cueing force comprises a soft stop proximate to the first pilot control device position.

7. The rotorcraft of claim 6, wherein the instructing of the trim assembly to apply a soft stop comprises:
    instructing the trim assembly to apply a first force against the pilot control device in resistance of the command from the pilot if the pilot control device is positioned between the first pilot control device position and the reference pilot control device position; and
    instructing the trim assembly to apply a second force, greater than the first force, against the pilot control device in resistance of the command from the pilot if the pilot control device is positioned beyond the first pilot control device position.

8. The rotorcraft of claim 1, wherein pilot control device comprises a collective pilot control device.

9. The rotorcraft of claim 1:
    wherein the first pilot control device position comprises a maximum displacement position of the pilot control device relative to the reference pilot control device position, wherein the maximum displacement position is configured to prevent over-flaring during performance of a flaring maneuver; and
wherein the trim assembly control system is configured to:
identify a second pilot control device position relative to the reference pilot control device position, wherein the second pilot control device position is identified based on the correspondence between the value of one or more variable and the one of the plurality of stages of the maneuver during the emergency flight condition, and wherein the second pilot control device position comprises a minimum displacement position of the pilot control device relative to the reference pilot control device position, wherein the minimum displacement position is configured to prevent under-flaring during performance of the flaring maneuver; and
instruct the trim assembly to apply the cueing force against the pilot control device if the pilot control device is positioned proximate to the second pilot control device position.

10. The rotorcraft of claim 1, wherein the one or more variable comprises an altitude variable and a speed variable, and where the correspondence comprises:
different values of each of the altitude variable and the speed variable corresponding to different stages of the plurality of stages of the maneuver.

11. A pilot assistance system for an aircraft, comprising:
a trim assembly operable to communicate with a pilot control device and operable to apply a force against the pilot control device in resistance of a command received from a pilot via the pilot control device; and
a trim assembly control system in communication with the trim assembly and configured to:
determine that the aircraft is operating in an emergency flight condition;
identify a first pilot control device position relative to a reference pilot control device position, wherein the first pilot control device position is identified based on a correspondence between a value of one or more variable and one of a plurality of stages of a maneuver during the emergency flight condition; and
instruct the trim assembly to apply a cueing force against the pilot control device if the pilot control device is positioned proximate to the first pilot control device position.

12. The pilot assistance system of claim 11, wherein the emergency flight condition comprises a failure of at least one of engine.

13. The pilot assistance system of claim 11, wherein:
the trim assembly control system is configured to apply the cueing force against the pilot control device in response to a failure of at least one engine; and
the first pilot control device position identified by the trim assembly control system represents a preferred position of the pilot control device during performance of a flaring maneuver.

14. The pilot assistance system of claim 13, the trim assembly control system configured to move the first pilot control device position relative to the reference position during the performance of the flaring maneuver.

15. The pilot assistance system of claim 11, wherein the cueing force comprises a soft stop proximate to the first pilot control device position.

16. The pilot assistance system of claim 15, wherein the instructing the trim assembly to apply a soft stop comprises:
instructing the trim assembly to apply a first force against the pilot control device in resistance of the command from the pilot if the pilot control device is positioned between the first pilot control device position and the reference pilot control device position; and
instructing the trim assembly to apply a second force, greater than the first force, against the pilot control device in resistance of the command from the pilot if the pilot control device is positioned beyond the first pilot control device position.

17. The pilot assistance system of claim 11, wherein the one or more variable comprises an altitude variable and a speed variable, and where the correspondence comprises:
different values of each of the altitude variable and the speed variable corresponding to different stages of the plurality of stages of the maneuver.

18. A method for assisting a pilot during operation of an aircraft, comprising:
determining that the aircraft is operating in an emergency flight condition;
identifying a first pilot control device position of a pilot control device relative to a reference pilot control device position, wherein the first pilot control device position is identified based on a correspondence between a value of one or more variable and one of a plurality of stages of a maneuver during the emergency flight condition; and
instructing a trim assembly to apply a cueing force against the pilot control device if the pilot control device is positioned proximate to the first pilot control device position.

19. The method of claim 18, wherein the emergency flight condition comprises a failure of at least one engine.

20. The method of claim 18, wherein the one or more variable comprises an altitude variable and a speed variable, and where the correspondence comprises:
different values of each of the altitude variable and the speed variable corresponding to different stages of the plurality of stages of the maneuver.

* * * * *